US008093498B2

(12) United States Patent
Bruza

(10) Patent No.: US 8,093,498 B2
(45) Date of Patent: Jan. 10, 2012

(54) BUSBAR ASSEMBLY

(75) Inventor: Phillip Stephen Bruza, Peoria, IL (US)

(73) Assignee: Caterpillar, Inc., Peoria, IL (US)

( * ) Notice: Subject to any disclaimer, the term of this patent is extended or adjusted under 35 U.S.C. 154(b) by 481 days.

(21) Appl. No.: 12/342,447

(22) Filed: Dec. 23, 2008

(65) Prior Publication Data

US 2010/0159754 A1 Jun. 24, 2010

(51) Int. Cl.
*H02G 5/00* (2006.01)

(52) U.S. Cl. ........................................................ 174/68.2

(58) Field of Classification Search ................. 174/68.2, 174/68.1, 68.3, 95; 439/131, 135, 798, 792
See application file for complete search history.

(56) References Cited

U.S. PATENT DOCUMENTS

| | | | |
|---|---|---|---|
| 4,727,220 | A | 2/1988 | Wagener et al. |
| 5,854,445 | A | 12/1998 | Graham |
| 5,944,566 | A | 8/1999 | Gossmann |
| 6,517,363 | B2 | 2/2003 | Ross |
| 7,387,547 | B1 | 6/2008 | Fuzetti |

FOREIGN PATENT DOCUMENTS

| | | | |
|---|---|---|---|
| DE | 2459943 | * | 7/1976 |
| EP | 0278984 | | 8/1988 |

* cited by examiner

*Primary Examiner* — Javaid Nasri
(74) *Attorney, Agent, or Firm* — Robin S. Fahlberg

(57) ABSTRACT

A busbar assembly is disclosed. The busbar assembly includes a conducting bar. The conducting bar includes a port adapted to retain and conduct electricity to a cable. The busbar assembly additionally includes a cover adapted to allow the cable to be inserted and removed from the port in a first position and to retain the cable in the port in a second position.

12 Claims, 5 Drawing Sheets

BUSBAR ASSEMBLY

TECHNICAL FIELD

The present disclosure relates generally to an assembly for connecting one electric conductor to another. Specifically the present disclosure relates to a busbar assembly for connecting a conducting bar to a cable.

BACKGROUND

Busbar assemblies are commonly used in the electric power industry to connect electric power sources, connectors, and loads. Generally, the busbar assemblies include conducting bars capable of conducting large amounts of electric current. One or more electric cables may be attached to the conducting bars to transmit the current to loads.

Busbar assemblies are typically included on generator sets to connect a current producing generator coils to an electric load. A generator set includes a combination of a generator and a prime mover, for example a combustion engine. The generator and the prime mover are mounted together along with other accessories on an anchor platform to form an integral unit commonly termed a genset. As fuel is burned within the prime mover, a mechanical rotation is created that drives the generator to produce electrical power.

A terminal box is typically included within the genset and houses electronics used to monitor and control genset operation, busbar assemblies, and connection points for electric loads. Typically, conducting bars in busbar assemblies are connected to current generating coils in the generator. Cables are connected from the conducting bars to customer connection points such as additional busbar assemblies or circuit breakers.

Generally, technicians connect the cables to the conducting bars during assembly. This may be done with nuts and bolts or other fasteners. This is sometimes difficult as each cable must be connected individually and there is little space to work in. A busbar assembly that would simplify connecting the conducting bars with the cables is desired.

An example of a busbar assembly having simplified connections is disclosed in U.S. Pat. No. 7,387,547 (the '547 patent) issued to Fuzetti on Jun. 17, 2008. In particular, the '547 patent discloses busbar assemblies that allow electric current to be distributed through electrically conductive cables that are held in contact with a substantially solid conductive bar by a cable retention system that does not require through-holes in the conductive bar which decrease the bar's current carrying capacity. Further, the cable retention system retains the cables in consistent contact with the bar and resists loosening due to vibration and thermal cycling.

SUMMARY OF THE INVENTION

According to an exemplary embodiment, a busbar assembly is disclosed. The busbar assembly includes a conducting bar. The conducting bar includes a port adapted to retain and conduct electricity to a cable. The busbar assembly additionally includes a cover adapted to allow the cable to be inserted and removed from the port in a first position and to retain the cable in the port in a second position.

In another exemplary embodiment, a busbar assembly is disclosed including a conducting bar including multiple ports, each of the multiple ports adapted to retain and conduct electricity to a cable. The busbar assembly additionally includes a cover adapted to allow the cables to be inserted and removed from the multiple ports in a first position and to retain the cable in the multiple ports in a second position.

In another exemplary embodiment, a method of connecting a generator to a load through a busbar assembly is disclosed. The method includes inserting a cable in a port of a conducting bar electrically connected to the generator while a cover is in a first position. Additionally, the method includes moving the cover to a second position to retain the cable in the port, and locking the cover in the second position.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
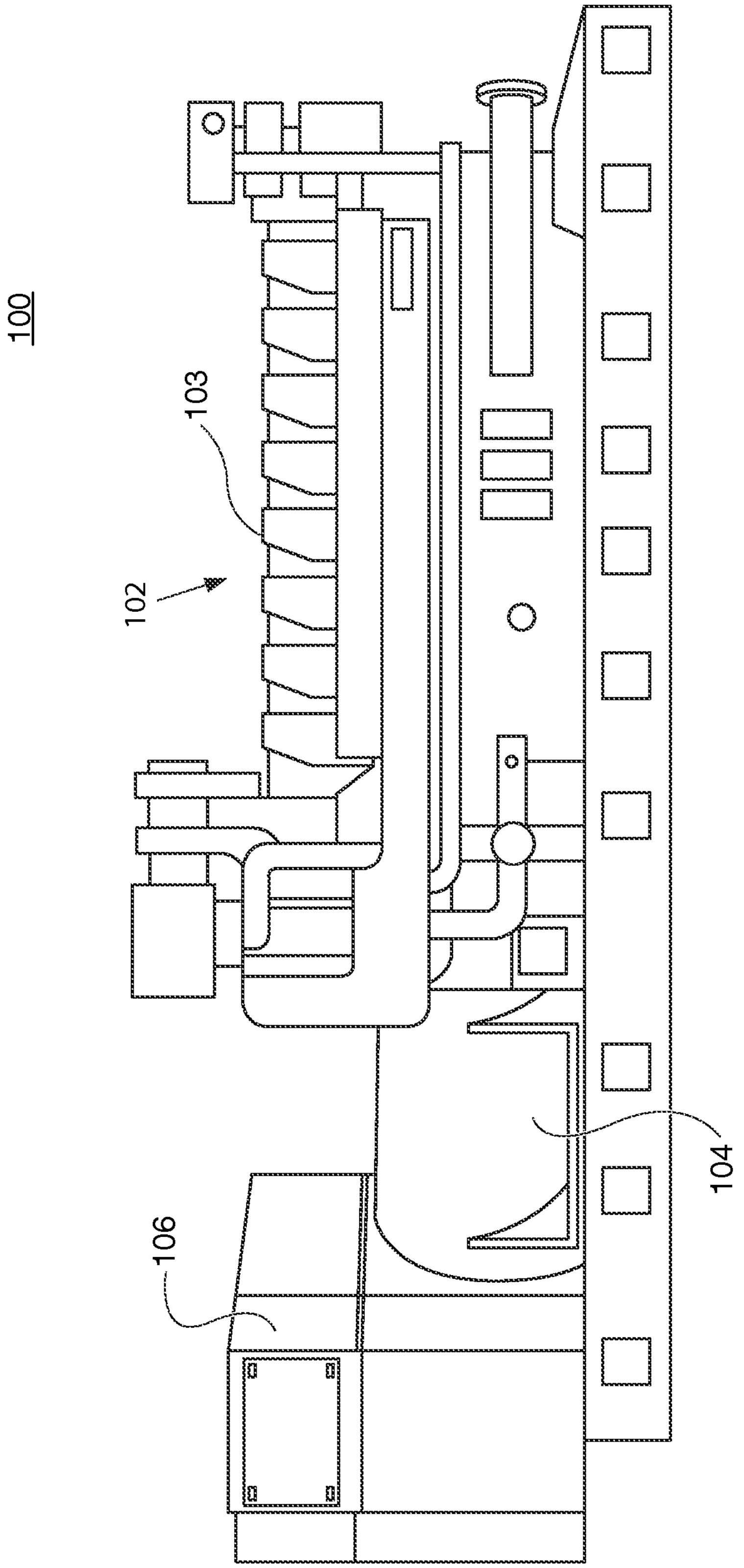
FIG. 1 illustrates an exemplary embodiment of a genset.

FIG. 1 illustrates an exemplary embodiment of a generator set 100. In the depicted embodiment the generator set 100 includes a power source 102, a generator 104, and a terminal box 106. In alternative embodiments, the generator set 100 may include any aggregate of one or more generators 104 together with the equipment and plant for producing the energy that drives them.

In the depicted embodiment the power source 102 is an internal combustion engine 103. The engine 103 burns fuel to produce a mechanical rotation. The engine 103 is operably coupled to the generator 104 in such a way as to transmit mechanical rotation and drive the generator 104. In alternative embodiments the power source 102 may be any device which provides the energy to drive the generator 104. For example, power source 102 may include one of a turbine engine (not shown), a rotary engine (not shown), and a wind powered source such as a windmill and transmission mechanism (not shown).

The generator 104 may be any of a variety of electromechanical devices that convert mechanical power into electrical power. The mechanical power may be converted to electrical power through Faraday induction effects between moving and stationary current carrying coils and/or magnets. Illustrative and non-limiting examples of generator 104 include an AC induction generator, a permanent-magnet generator, an AC asynchronous generator, or a switched-reluctance generator.

Terminal box 106 may include a structure in which power conductors from the generator 104 are connected to leads which may supply electrical loads with electrical power. Electronic controls for controlling the generator set 100 may be mounted in the terminal box 106. Terminal box 106 may include a cover and such accessories as mounting hardware, brackets, locks, and conduit fittings. Terminal box 106 may be constructed to provide protection for the power connections and electronic controls. Terminal box 106 may be mounted on the generator 104.

Figure 2:
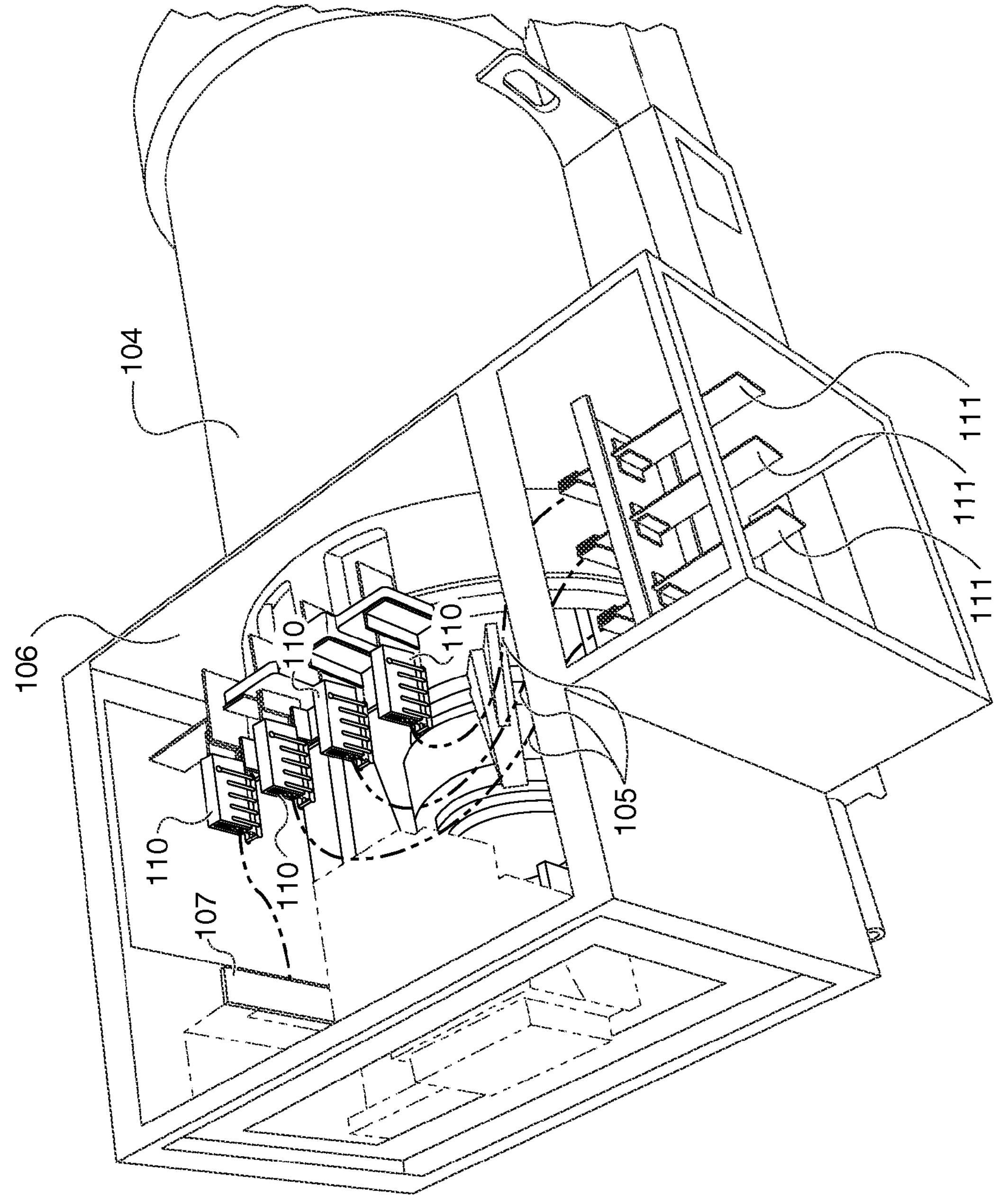
FIG. 2 illustrates an exemplary embodiment of a terminal box.

FIG. 2 is an exemplary illustration of a portion of terminal box 106 mounted on generator 104. Busbar assemblies 110 are mounted in the terminal box 106. Busbar assemblies 110 may be adapted to connect the power conductors from the generator 104 to leads which may supply electrical loads with electric power (not shown). In the depicted embodiment, busbar assemblies 110 are adapted to electrically connect with electrical coils in generator 104 (not shown). Customer connectors 111 are adapted to electrically connect with leads which supply electrical loads with electrical power. Cables 108 (see FIG. 6) may connect busbar assemblies 110 with connectors 111 along dotted lines 105. Cables 108 may also connect a busbar assembly 110 with a ground 107.

For the purposes of this description, electrically connected means that two or more devices, cables, or structures are connected in such a way as to allow electric current to flow between them.

Busbar assembly 110 may include a combination of mechanical parts including a conducting bar 112 (see FIG. 3) that is capable of conducting heavy electrical currents. Busbar assembly 110 may include electrical connections to the bar 112 for multiple cables 108. Although busbar assembly 110 is depicted connecting the generator 104 with an electrical load, it will be readily apparent to one skilled in the art that busbar assembly 110 is not limited to this application. Busbar assembly 110 may be used to electrically connect any electrical power source, electrical load, and/or electrical conducting device.

In alternative embodiments generator set 100 may have no terminal box 106. Busbar assemblies 110 may be mounted on the generator 104 or somewhere else on the generator set 100. Busbar assemblies 110 may be adapted to electrically connect current producing coils in generator 104 directly to electric loads through cables 108 without a connector 111. It will be apparent to an ordinary person skilled in the art now or in the future that the current producing coils in generator 104 may be connected to electric loads through the busbar assembly 110 in a variety of other ways. For example, circuit breakers or other devices which are adapted to electrically connect leads which supply electrical loads with electric power to current producing coils in generator 104 may be mounted in terminal box 106 and electrically connected to or through busbar assemblies 110. The terminal box 106 may take on structural configurations other than that shown as would be known or contemplated by an ordinary person skilled in the art now or in the future.

Figure 3:
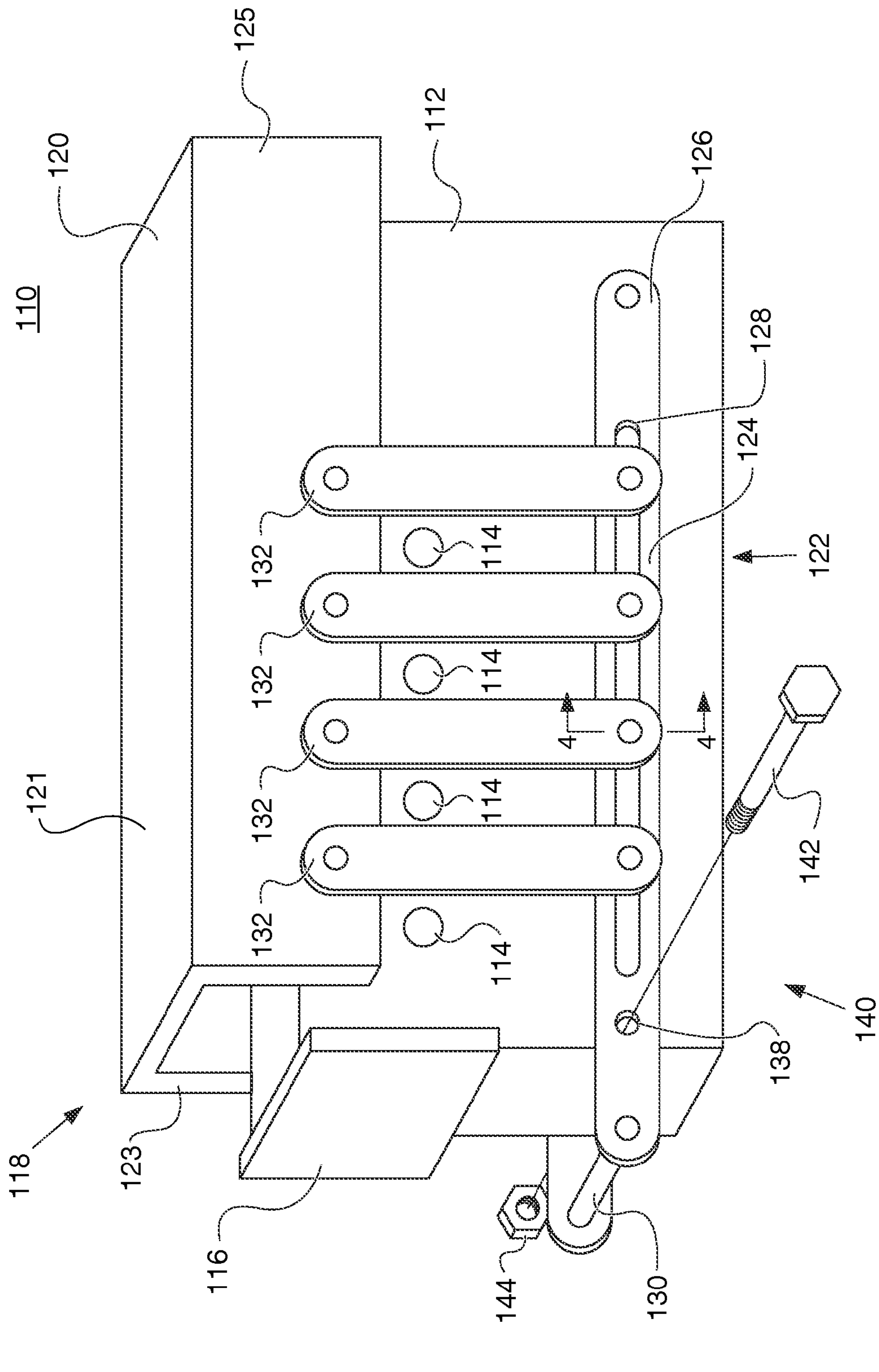
FIG. 3 illustrates an exemplary embodiment of a busbar assembly in an open position.
Figure 6:
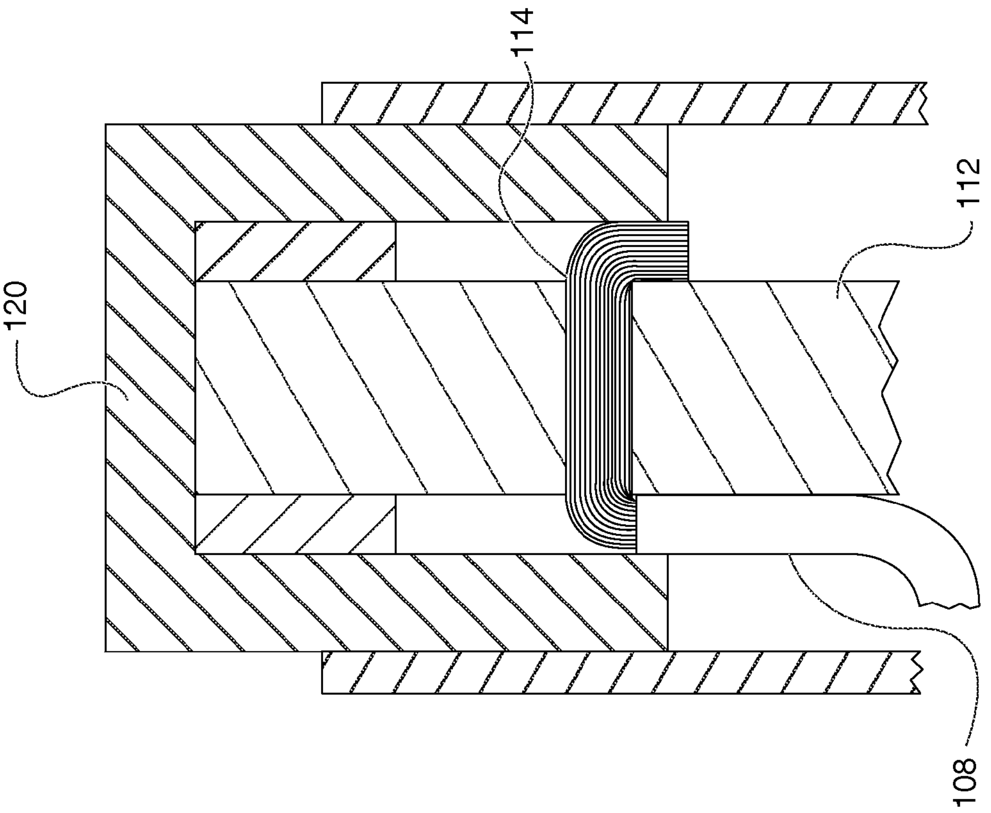
FIG. 6 illustrates a cable in a port of a busbar assembly in a closed position.
Figure 5:
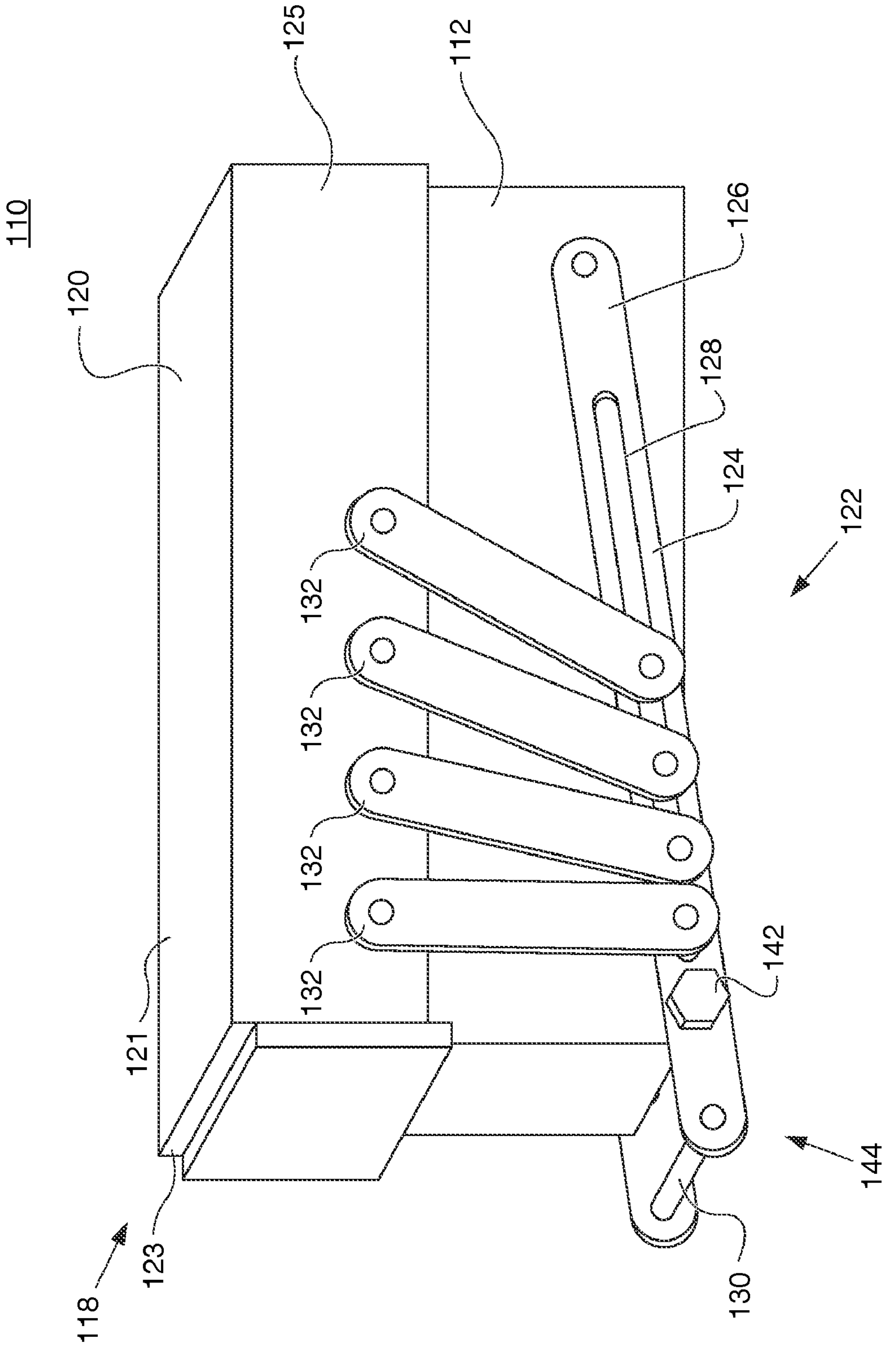
FIG. 5 illustrates an exemplary embodiment of a busbar assembly in a closed position.

FIG. 3 illustrates an exemplary embodiment of busbar assembly 110. The busbar assembly 110 may have an open position and a closed position. FIG. 3 illustrates the busbar assembly 110 in the open position without power cables 108 connected. FIG. 5 illustrates busbar assembly 110 in the closed position. FIG. 6 illustrates a cable 108 connected to the busbar assembly 110 in the closed position. In the illustrated embodiment, busbar assembly 110 includes a conducting bar 112 and a cable retention device 118.

Bar 112 may include a heavy electrical conductor operable to conduct electric current. Bar 112 may be rectangularly shaped and include ports 114 and plate 116. In alternative embodiments bar 112 may have other shapes.

In the open position, ports 114 are adapted such that cables 108 may be inserted into and removed from them. In the closed position (FIGS. 5 and 6), the cables 108 may be retained in the ports 114 in such a way that electrical current may flow from the bar 112 to the cables 108, and from the cables 108 to the bar 112. The cable retention device 118 may be moved in relation to the bar 112 to retain the cables 108 in the ports 114 when the busbar assembly 110 is in the closed position, and allow the cables 108 to be inserted into or removed from ports 114 when the busbar assembly is in the open position.

Ports 114 may be generally circular apertures extending through the bar 112. In alternative embodiments ports 114 may include apertures of other shapes. Alternative embodiments may also include inserts into the apertures.

The cable retention device 118 may include a cable cover 120 and a retaining mechanism 122. The cable cover 120 may be adapted to fit over and/or around the bar 112 holding the cables 108 secure in the ports 114 when the busbar assembly 112 is in the closed position. The cable cover 120 may include three generally rectangular sections 121, 123, and 125 of the same length. Sections 123 and 125 may be generally perpendicular to section 121. Sections 123 and 125 may intersect section 121 along opposite sides, forming a generally rectangular "U" shaped cross-section.

The retaining mechanism 122 may be adapted to move and retain the cable cover 120 in a position in relation to the bar 112 that will retain the cables 108 in ports 114. Retaining mechanism 122 may include a lever assembly 124 and a locking assembly 140. The lever assembly 124 may be adapted to move the cable cover 120 in a position in relation to the bar 112 that will retain the cables 108 in ports 114. The lever assembly 124 may also move the cable cover 120 in a position in relation to the bar 112 that allows cables 108 to be inserted into and removed from ports 114. The locking assembly 140 may be adapted to retain the cable cover 120 in a position in relation to the bar 112 that will retain cables 108 in ports 114.

The lever assembly 124 may include lever bars 126, retaining bars 132, and a handle 130. FIGS. 3 and 5 show a lever bar 126 and retaining bars 132 on one side of the busbar assembly 110. A similar configuration of a lever bar 126 and retaining bars 132 may be included on the opposite side of the busbar assembly 110. The lever bar 126 may include aperture 128 and a locking aperture 138. The lever may be pivotally attached to the bar 112.

Figure 4:
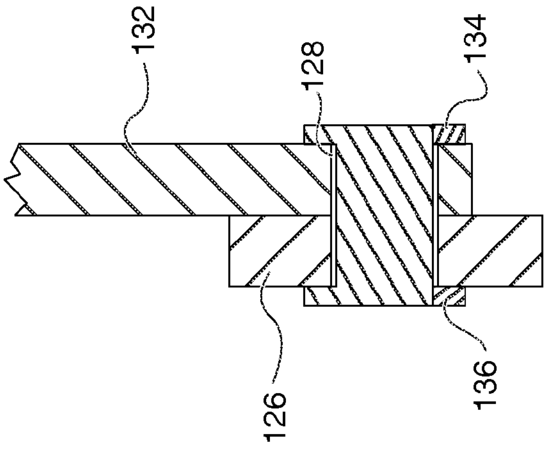
FIG. 4 illustrates an exemplary connection of a lever bar and a retaining bar.

The retaining bars 132 may be pivotally attached to the cover 118 on a first end, and slideably attached to the lever bar 124 through aperture 128 on a second end. FIG. 4 depicts the attachment of the second end of the retaining bar 132 to lever bar 126 at aperture 128 with a bolt 134 and nut 136.

Handle 130 may be attached to lever bars 124 on both sides of busbar assembly 110.

Locking assembly 140 may include a locking pin 142 and a locking nut 144. When busbar assembly 112 is in an open position, locking pin 142 and locking nut 144 may not be in use. When busbar assembly 112 is in a closed position, locking pin 142 may be inserted into locking apertures 138 and held in place with locking nut 144.

In alternative embodiments, the retaining mechanism 122 may include other devices adapted to move and retain the cable cover 120 in a position in relation to the bar 112 that will retain cables 108 in ports 114. For example, the retaining mechanism 122 may include a cover 118 adapted to be moved to the closed position manually and retained with bolts. In other embodiments the cover 118 may be adapted to be moved into the closed position with an automated machine and retained with bolts or other type locking assembly 140.

Other embodiments may include an alternative lever assembly 124. For example, when multiple busbar assemblies 110 are used, lever assemblies 124 on each busbar assembly 110 may be mechanically connected such that a handle 130 connected to the busbar assemblies 110 may be used to move all the busbar assemblies 110 to a closed or an open position. In an alternative embodiment, an electrical or mechanical actuator may be used to move one or multiple busbar assemblies 110 to a closed or open position. The actuator may be manually or electronically controlled.

Alternative embodiments may include alternate locking assemblies 140. For example, hooks, or other combinations of bolts and nuts may be used. Switches may lock actuators in place, effectively locking the busbar assembly 110 in the closed position.

Referring to FIG. 6, a cutaway of the busbar assembly 110 is shown in the closed position with a cable 108 secured in port 114.

INDUSTRIAL APPLICABILITY

When assembling a generator set 100, it is desirable that electrical connections between the power conductors from the generator 104 and connectors 111 for customer electric loads be made in the most time efficient and simplest manner. The power conductors from the generator 104 may be electrically connected to busbar assemblies 110 through conducting bars 112. A first end of an electrical cable 108 may be stripped of insulation and inserted into a port 114 while busbar assembly 110 is in the open position. The handle 130 may be moved downward, pulling the cover 120 over the bar 112, crimping the cable 108, and securing the cable 108 in the port 114. The locking pin 142 may be inserted through apertures 138 on both lever bars 126, and secured with locking nut 144. The locking assembly 140 prevents the handle 130 from moving upward and secures the busbar assembly 110 in the closed position. A second end of cable 108 may be fastened to connector 111 or ground 107 in any way known to an ordinary person skilled in the art now or in the future. Connector 111 provides a connection for electrical loads. In alternative embodiments, the second end of the cable 108 may be fastened directly to an electrical load, or be inserted into a port 114 on another busbar assembly 110.

From the foregoing it will be appreciated that, although specific embodiments have been described herein for purposes of illustration, various modifications or variations may be made without deviating from the spirit or scope of inventive features claimed herein. Other embodiments will be apparent to those skilled in the art from consideration of the specification and figures and practice of the arrangements disclosed herein. It is intended that the specification and disclosed examples be considered as exemplary only, with a true inventive scope and spirit being indicated by the following claims and their equivalents.

What is claimed is:

1. A busbar assembly, comprising:

a conducting bar including a port adapted to retain and conduct electricity to a cable, and a cover including an open position and a closed position, and wherein;

the busbar assembly is configured to allow the cable to be inserted and removed from the port when the cover is in the open position, and the conducting bar is partially enclosed by the cover, and the cover is configured to press a portion of the cable against the conducting bar and fixedly retain the cable in the port, when the cover is in the closed position.

2. The busbar assembly of claim 1, further comprising a locking assembly adapted to lock the cover in the closed position.

3. The busbar assembly of claim 1, further comprising a retaining mechanism adapted to move the cover between the open position and the closed position.

4. A busbar apparatus, comprising multiple busbar assemblies according to claim 1, a retaining mechanism adapted to move the cover on each of the multiple busbar assemblies between the open position and the closed position, and a locking assembly adapted to lock the cover on each of the multiple busbar assemblies in the closed position.

5. A generator set, comprising:

a generator, a busbar assembly according to claim 1, and wherein the conducting bar is electrically connected to the generator.

6. The generator set of claim 5, further comprising a terminal box, wherein the busbar assembly is mounted in the terminal box.

7. The busbar assembly of claim 3, wherein the retaining mechanism includes:

one or more retaining bars rotatably coupled to the cover, and a lever slideably coupled to the one or more retaining bars.

8. The busbar of claim assembly of claim 3, wherein the retaining mechanism includes at least one locking aperture, and further comprising a locking assembly adapted to lock the cover in the closed position, the locking assembly including a retaining bolt adapted to be inserted into the at least one locking aperture.

9. A busbar assembly, comprising:

a conducting bar including a port adapted to retain and conduct electricity to a cable, and a cover adapted to allow the cable to be inserted and removed from the port in an open position and to retain the cable in the port in a closed position, and a retaining mechanism adapted to move the cover between the open position and the closed position, the retaining mechanism including, one or more retaining bars rotatably coupled to the cover, and a lever slideably coupled to the one or more retaining bars.

10. A busbar assembly, comprising:

a conducting bar including a port adapted to retain and conduct electricity to a cable, and a cover adapted to allow the cable to be inserted and removed from the port in an open position and to retain the cable in the port in a closed position, a retaining mechanism adapted to move the cover between the open position and the closed position, the retaining mechanism including at least one locking aperture, and a locking assembly adapted to lock the cover in the closed position, the locking assembly including a retaining bolt adapted to be inserted into the at least one locking aperture.

11. A busbar assembly, comprising:

a conducting bar including multiple ports, each of the multiple ports adapted to retain and conduct electricity to a cable, and a cover including an open position and a closed position, and wherein;

the busbar assembly is configured to allow the cables to be inserted and removed from the ports when the cover is in the open position, and the conducting bar is partially enclosed by the cover, and the cover is configured to press a portion of each of the cables against the conducting bar and fixedly retain each of the cables in one of the ports, when the cover is in the closed position.

12. A method of connecting a generator to a load through a busbar assembly, comprising:

inserting a cable in a port of a conducting bar electrically connected to the generator while a cover is in an open position, moving the cover to a closed position, pressing at least a portion of the cable against the conducting bar when the cover is in the closed position, fixedly retaining the cable in the port when the cover is in the closed position, partially enclosing the conducting bar with the cover when the cover is in the closed position, and locking the cover in the closed position.

* * * * *